June 4, 1929.  C. MACBETH  1,715,851
PRESS
Filed Nov. 19, 1926   3 Sheets-Sheet 1
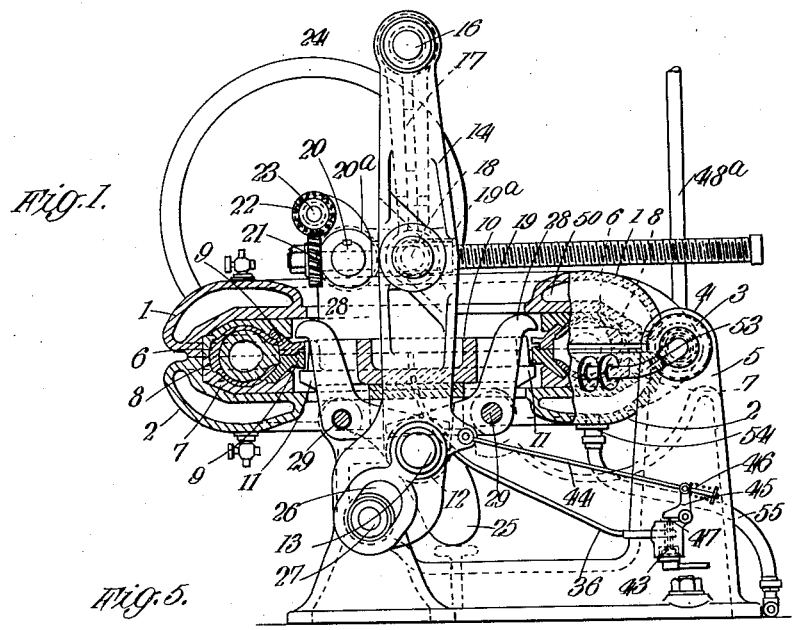
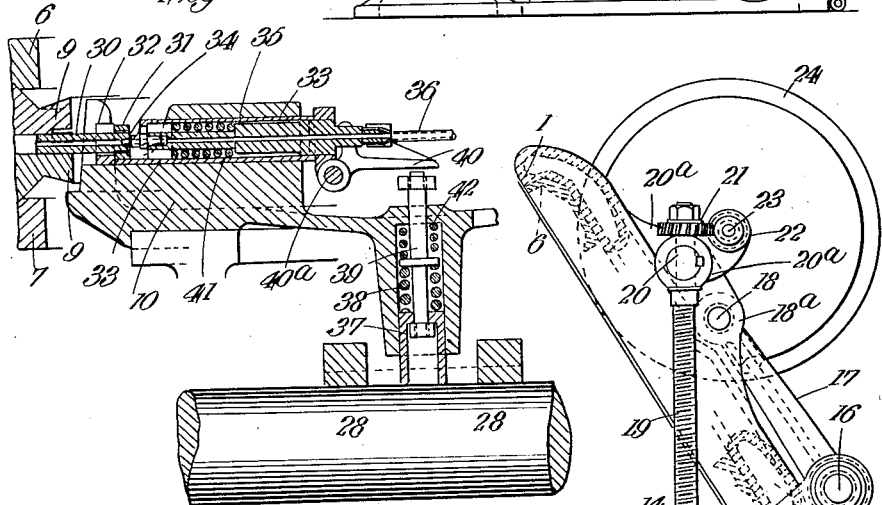
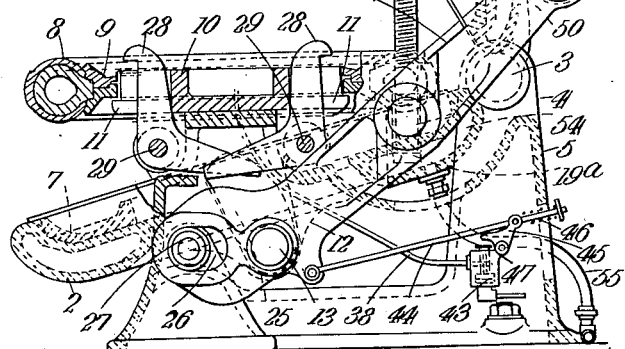

June 4, 1929.  C. MACBETH  1,715,851
PRESS
Filed Nov. 19, 1926  3 Sheets-Sheet 2

Inventor
Colin MacBeth

June 4, 1929.  C. MACBETH  1,715,851
PRESS
Filed Nov. 19, 1926  3 Sheets-Sheet 3
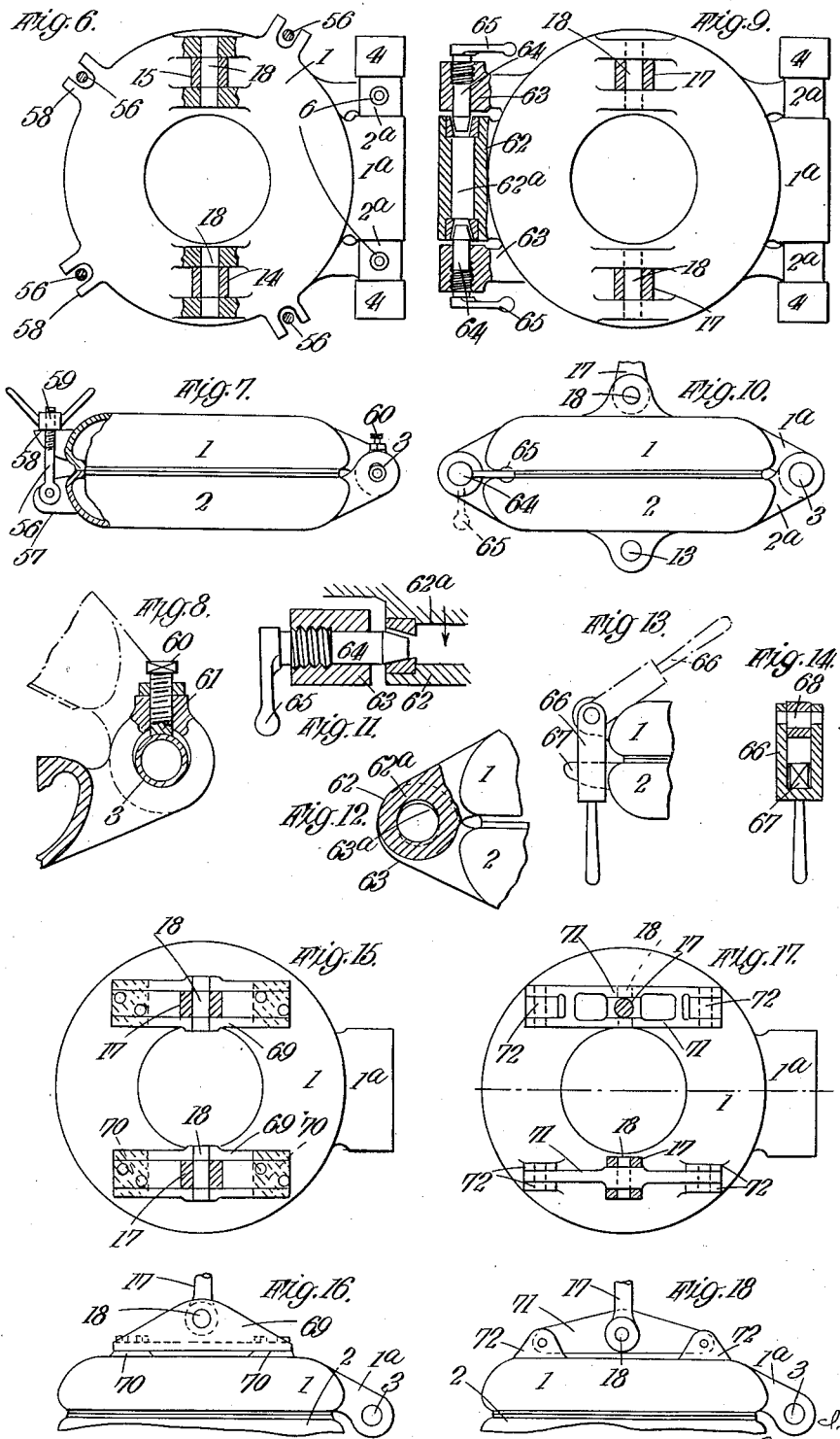

Patented June 4, 1929.

1,715,851

UNITED STATES PATENT OFFICE.

COLIN MACBETH, OF BIRMINGHAM, ENGLAND.

PRESS.

Application filed November 19, 1926, Serial No. 149,366, and in Great Britain March 19, 1926.

This invention relates to vulcanizing or similar presses for use in the manufacture of pneumatic tires, tennis balls, golf balls, and various kinds of rubber or similar goods or articles.

The chief object of the present invention is to provide an improved construction of vulcanizing or similar press whereby the opening or closing of the mould members between which the article or articles are held is facilitated.

Another object of the invention is to provide improved means particularly for tire vulcanizing presses for facilitating the handling and manipulation of the tire unit, while a further object is to provide improved means for supplying internal pressure to the article to be dealt with in the press.

According to the present invention the vulcanizing or similar press comprises mould members that are hinged or similarly connected together and are provided or associated with toggle mechanism adapted to be operated for opening and closing the press and to maintain the press in the closed or operative position. The toggle mechanism comprises links connected at or near one end to one of the said mould members (or to a fixed part adjacent to this member) and at the other end to a toggle link or member which latter is connected to the other mould member, the arrangement being such that the said links and toggle member can be actuated for opening and closing the press and also for maintaining the press closed during the treatment of the articles therein. Usually the mould members are horizontally disposed with the upper one angularly movable on a horizontal axis and although the lower mould member may be fixed, it can be movable as for example in a tire vulcanizing press to facilitate stripping of the tire unit from the mould members, the tire unit being mounted on a suitable fixed support. Any suitable means may be provided for opening the said links and toggle lever and in one construction screw operated mechanism is provided which enables the mould members to be opened by rotary movement, for example by means of a hand wheel. For this purpose an operating shaft or spindle is carried by the mould member to which the aforesaid toggle member is connected and it is geared to screw threaded rods that are mounted in swivel nuts in the aforesaid links and in a swivel connection or bearing on the said mould member so that when the shaft or spindle is rotated by the hand wheel for example, the screw threaded rods are rotated with the result that the links and toggle member and the mould member connected to the said toggle member are displaced as required for opening or closing the mould members. In the case of a horizontal press having a movable lower mould member, the said links may be connected to the said lower member and the lower parts of the said links beyond the point of connection to the lower mould member may co-operate with fixed stops for enabling the parts to assume the position in which the lower member in conjunction with the toggle mechanism balances the upper one, thus avoiding the use of a balance weight as sometimes provided on the rear part of the upper mould member, and thereby economizing in floor space.

In the case of a tire vulcanizing press wherein both of the mould members are movable, improved means may be provided for supporting the tire unit or the like in a definite fixed position so that a comparatively rigid connection can be provided for supplying internal pressure to the said tire unit, that is to the air bag or space within a pneumatic tire cover which may be held in suitable bead or clip rings and although the supporting means prevent unrequired movement of the tire unit, provision may be made for such slight displacement as may be necessary to adjust or centre it in relation to the mould members.

Means are also provided whereby the press is secured in its closed or operative position prior to the inflating or internal pressure being allowed to pass into the air bag or space within the tire unit and these means can be controlled or operated by the aforesaid toggle mechanism so as to cause a valve or the like on the air bag to be automatically connected to the pipe that supplies the pressure medium, which latter may be supplied and cut off by a valve device operated by the said toggle mechanism.

Improved gripping or clasping devices are provided for holding the tire unit on its support during the opening of the press to ensure that it becomes separated from the upper mould member when the latter is opened and as the tire unit is supported in a fixed position this ensures stripping or removal of the tire unit from the lower mould member by reason of the latter moving away from the tire unit and the aforesaid fixed support carrying the same. The said gripping or clasping devices are adapted to be controlled by the aforesaid toggle mechanism or a part associated therewith so that the gripping devices are maintained in engagement with the tire unit until they are released by the said mechanism when the latter assumes or approaches the position in which the pressure is fully opened.

In cases where high internal pressure may be required within the press supplementary clamping means such as swing or other bolts, screw devices, cam locking means, or the like may be provided to prevent separation at the contacting surfaces of the mould which might otherwise take place due to a certain amount of "spring" in the said members when subjected to the high internal pressure.

In order that the invention may be clearly understood and readily carried into effect, the same will now be fully described with reference to the accompanying drawings, in which:—

Figures 1 and 2 are side views partly in section of one construction of horizontal tyre vulcanizing press according to this invention showing the press in the closed and open positions respectively.

Figure 5 is an enlarged sectional view of the automatic mechanism for connecting the pressure medium supply pipe to the interior of the tyre unit.

Figures 6 to 14 are diagrammatic views showing various constructions of the supplementary clamping means which may be provided in some cases.

Figures 15 to 18 are diagrammatic views showing modified means for distributing the clamping or closing pressure exerted by the toggle mechanism.

Figure 3:
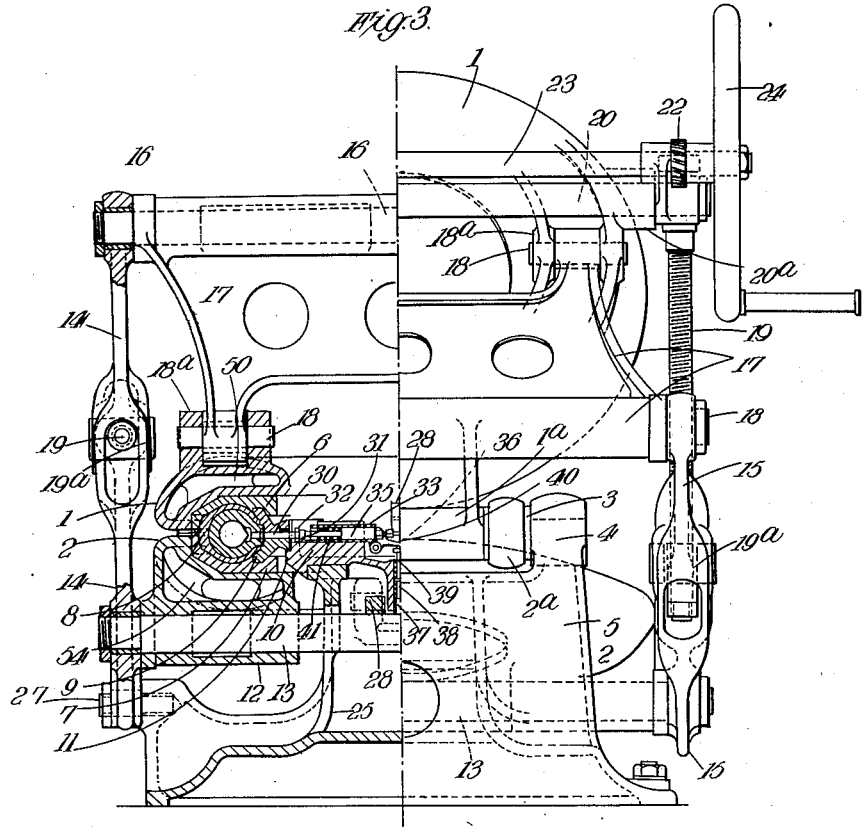
Figure 3 is a view at right angles to those shown in Figures 1 and 2 looking in the direction of the arrows and illustrating in the left hand half, the press in section in the closed position (shown in Figure 1) and in the right hand half, the press in the open position (shown in Figure 2).
Figure 4:
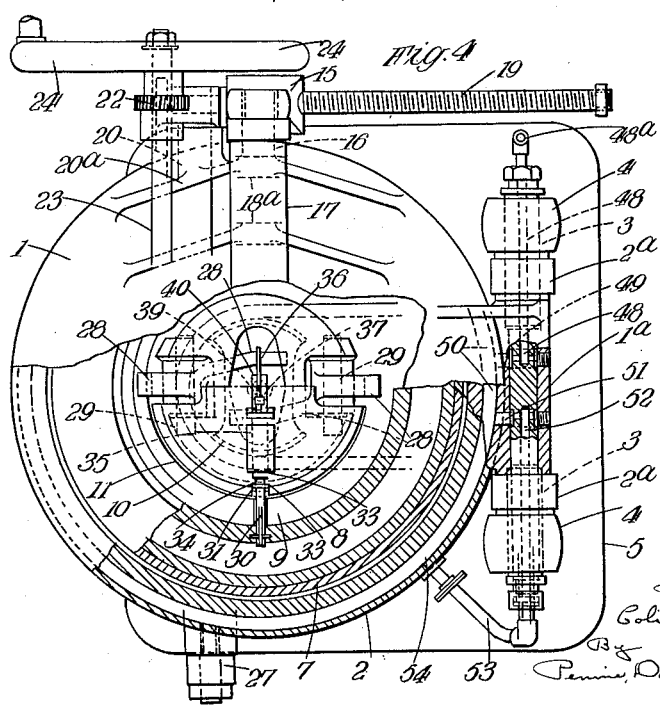
Figure 4 is a plan view, showing part of the upper mould member removed and part of the lower mould member in section.

Referring more particularly to Figures 1 to 4, the press comprises upper and lower mould members or containers 1 and 2 which by means of lugs 1ª and 2ª are hinged on a horizontal hinge pin or shaft 3 supported in bearings 4 on the main frame or base 5 of the press. These mould members as shown are fitted with detachable mould shells or surfaces 6 and 7 which are adapted to contact with the tread and side walls of the tyre 8 and also to embrace bead or clip rings 9 which latter together with the tyre 8 (and an internal air bag) can be handled as a complete unit and placed into or removed from the press as such. Spaces are provided within the mould member to receive the heating medium for heating the mould shells or surfaces as hereinafter described. The tyre unit is adapted to be placed around a central support 10 and it is supported in a definite or fixed position horizontally by its bead or clip rings resting on a ledge 11 extending from the support 10. The tyre unit is supported with a certain looseness on the ledge 11 in a position slightly below the position it assumes when actually clamped between the mould shells 6 and 7. The mould members are fitted on the hinge pin or shaft 3 with a certain slackness between lugs 2ª and shaft 3 so that when they are in the operative position the registering of the mould members will control the concentric and proper positioning of the tyre unit. The lower mould member 1 is formed with or has attached to it lugs 12 that surround a transverse shaft 13 or the like which at its ends has pivotally mounted thereon diametrically opposite side links 14 and 15 (see Figure 3) pivotally connected to a transverse shaft 16 or the like which extends across the upper mould member and has pivotally mounted thereon a toggle arm or lever 17 which is also pivotally connected to axially aligned pins 18 fitted in lugs 18ª on or attached to the upper mould member as shown in Figures 3 and 4. As shown in Figures 1 and 2, slots 25 are provided in the main frame to afford clearance around the shaft 13 and the lugs 12. The ends of the side links 14 and 15 are provided with slots 26 in which fit rollers mounted on pins 27 fixed in the main frame. The said pins 27 and the rollers in conjunction with the hinge pin or shaft 3 support the two mould members in the closed or horizontal position and also provide the fulcrum point of the side links for enabling the lower mould member to be separated from the tyre unit as hereinafter described. The two side links 14 and 15, the toggle lever 17, the shafts 13, 16 and the pins 18 are so arranged that the links 14, 15 and the toggle lever 17 can assume a vertical or almost vertical position with the axes of the said shafts and pins in the same vertical plane, (see Figure 1) so that the side links 14 and 15 and the lever 17 form a toggle mechanism which can maintain the mould members in the closed position and which can also be operated to effect the opening and closing of the two mould members. Associated with each side link 14 and 15 is a screw rod 19 which is threaded through a nut 19ª mounted to swivel in each side link, the said screw rods 19 being secured to a transverse shaft 20 that can swivel in lugs 20ª on the upper mould member in front of the pins 18. The screw rods 19 have spiral or other gear wheels 21 thereon which are engaged by gear wheels 22 on a transverse operating spindle 23 having a hand wheel 24 (that may be constructed to serve as a flywheel), the said spindle 23 being rotatably mounted in bearings or lugs on or attached to the upper mould member. When the links 14 and 15 and the toggle lever 17 are in position to close the press the screw rods 19 are approximately horizontal as shown in Figure 1, but by operating the aforesaid spindle 23 and the associated gearing, the screw rods are drawn through the swivel nuts 19ª towards a vertical position so that the side links 14 and 15 are caused to move angularly in a rearward direction whilst the toggle lever 17 is angularly moved on the shaft 16 upwardly with the result that the upper mould member 1 is raised on the hinge pin or shaft 3. Simultaneously the shaft 13 on the lower mould member 2 is caused to move downwardly in the clearance slots 25 due to the swivelling action of the side links 14 and 15 and their slotted ends 26 about the fixed pins 27 and the rollers thereon thus lowering the lower mould member on the hinge pin or shaft 3. The two mould members 1 and 2 with the mould shells 6 and 7 therein are therefore moved away from the tyre unit which remains supported on the ledge 11 of the central support 10. The upper mould member moves to a greater extent than the lower one to provide sufficient space for removal or replacement of the tyre unit and the position assumed by the various parts when the mould is fully opened are as illustrated in Figure 2. The outer or lower ends of the screw rods 19 may be provided with abutments or rubber buffers which act as limiting stops when the screw rods 19 reach the vertical position shown in Figure 2 so as to retain the toggle mechanism in the position illustrated for maintaining the mould members fully open with the lower mould member and the toggle mechanism approximately balancing the upper mould member. If desired, however, a balance weight may be provided on the shaft 16 to assist in maintaining the upper mould member open without necessitating any alteration in the general design or construction of the press and without increasing the floor space required for the press.

By rotating the hand wheel 24 and the spindle 23 in the direction opposite to that required for opening the mould members the screw rods 19 are drawn through the nuts 19ª and consequently the side links and the toggle lever are moved into the position shewn in Figure 1 thus bringing the mould members together and closing the press. When the mould members are brought together to embrace the tyre unit the latter is slightly raised from its ledge 11 on the support 10 by the lower mould shell 7, so that it is then held by and between the mould shells 6 and 7 in the mould members which are supported in the closed and operative position by the hinge connection to the shaft 3 and by the fixed pins or rollers 26 in the slotted lower ends of the side links 14 and 15. The necessary clamping pressure may be provided by the toggle mechanism (which may provide an infinite toggle if desired) but in some instances where very high internal pressures are employed supplementary securing means may be provided as hereinafter described. The toggle mechanism also provides an effective and powerful opening means for separating the two mould members from each other and from the tyre unit and instead of being hand actuated as above described it may be actuated by hydraulic or pneumatic means or by an electric motor or other power operated means. Also, instead of using the screw operated mechanism for operating and controlling the toggle mechanism as in light presses for instance, other means may be used and locking devices may be provided for retaining the mould members in the fully open position and also in the operative or closed position.

In order to ensure that the tyre unit is definitely and positively separated from the upper mould members when the latter is initially opened, retaining or gripping devices in the form of bell crank levers 28 are pivoted on pins 29 supported in the main frame and are formed with hook shaped ends located in slots or openings in the central support 10 for engaging the bead or clip rings 9 as shown in Figure 1. The lower parts of the bell crank levers 28 are so formed and positioned that they can be engaged by the shaft 13 carried by the lower mould member when this shaft is moved upwardly during the latter part of the closing movement so that the said levers 28 are moved outwardly at their upper ends to hook over the bead rings 9 of the tyre unit. During the initial movement of the side links 14 and 15 in effecting the opening operation, the shaft 13 is not appreciably lowered so that it maintains the hooked ends of the bell crank levers 28 in engagement with the tyre unit thus holding the latter against any tendency to move upwardly with the upper mould member when the latter commences to open. Subsequently the shaft 13 moves downwards as the side links 14 and 15 approach the position shown in Figure 2 thus enabling the lower ends of the said bell crank levers 28 to drop by the action of gravity and thus cause the upper and hooked ends to move away from and release the tyre unit which can therefore be removed from the support 10 and replaced by another one, these operations being facilitated owing to the reduced height of the press.

When it is desired to supply the pressure medium (for example compressed air) to the air bag within the tyre unit automatically, the air bag valve 30 is first connected to the air supply pipe during the closing of the press and subsequently the air admission valve is opened to allow the air to pass into the air bag just before the press is finally closed. One construction of mechanism for effecting the connection of the air supply pipe to the interior of the tyre unit is illustrated in Figure 5. In this example the air bag valve 30 is provided with a collar 31 and fits within a forked lug 32 extending upwardly from a sleeve 33 slidably mounted in the tyre unit support 10. The end of the air bag valve within the said collar 31 is coned to receive the coned end 34 of a nozzle 35 which is slidably fitted within the sleeve 33 and connected in any suitable manner to the air supply pipe 36. When the mould members are being moved into the closed position as hereinbefore described, the shaft 13 on the lower mould member in being raised engages a plunger 37, (see also Figure 3) and forces it upwardly within a tubular extension or boss on the tyre unit support 10 so that through the medium of a strong spring 38 the plunger raises a stem 39 which is adapted to angularly move a bell crank lever 40 pivotally mounted at 40ª on the sleeve 33. The bell crank lever 40 when angularly moved by the stem 39 is adapted to slidably move the air supply pipe nozzle 35 and the sleeve 33 in opposite directions so that the coned end 34 of the nozzle, enters the valve which is pressed by the lug 32 into close contact with the coned end 34 to make an effective airtight connection. This connection is maintained while the shaft 13 is in the raised position and the mould members are held together by the aforesaid toggle mechanism. A spring 41 surrounding the supply pipe nozzle 35 serves to return the sleeve 33, the nozzle 35 and the bell crank lever 40 to the normal position when the said shaft 13 descends during the opening of the press, this return movement of the parts resulting in the disconnection of the supply pipe nozzle 35 from the air bag valve 30. To ensure that the stem 39 returns to its normal or inoperative position when the shaft 13 descends a spring 42 is interposed between a collar on the said stem and the end of the extension or boss through which the stem passes, this spring being weaker than the spring 38 which latter is capable of being compressed by the shaft 13 after the stem 39 has been fully raised. The air supply may be controlled by hand or automatically and in one example of automatic control of an admission valve indicated for example at 43 in Figures 1 and 2 a rod 44 extending from the side link 14 is connected to a bell crank lever 45 through the medium of a spring 46 which normally allows a release valve 47 to remain in the open position as shown in Figure 2. Upon the spring 46 being sufficiently compressed by the rod 44 when the side link 14 approaches its vertical position just before the press is quite closed, the release valve 37 is caused to open the air admission valve 43 thus allowing air to pass through the air supply pipe 36 into the air bag within the tyre unit. As the press is opened, and the side links assume the inclined position, the spring 46 is gradually released and the air pressure soon exceeds the spring pressure with the result that the air admission valve 43 is closed and the release valve 47 opened.

Steam or other heating medium may be supplied to the mould members in any suitable or usual manner. In the example illustrated a steam supply pipe 48ª is connected to a passage 48 in the hinge pin or shaft 3 which may be fitted in a steam tight manner in the hinge lugs 1ª of the upper mould member. The steam tight fit may be provided in any suitable manner, for example, the use of copper washers in conjunction with screw operated adjusting sleeves. Openings are provided in the hinge pin 3 leading from the supply passage 48 to an aperture or port 49 which opens into the annular steam space 50 within the upper mould member. The steam supplied into the space 50 in the upper mould member passes through an opening 51 into another passage 52 in the said hinge pin or shaft 3 which passage is connected by means of a swiveling pipe 53 to the steam space 54 in the lower mould member from which the steam exhausts through a suitable flexible pipe 55. (See Figures 1 and 2). Although steam is referred to for heating mould members it is to be understood that hot water under pressure may be employed or electrical or other heating means may be used if desired. Owing to the lower mould member being supported on the shafts 3 and 13 loss of heat by conduction as occurs when the said member is directly supported on a large metal base is substantially reduced.

In cases where high internal pressures are used within the press there may be a tendency for the mould members acted upon by the toggle mechanism to separate slightly at the contacting faces due to a certain amount of "spring" in the said members. This may be overcome in many ways, for instance, by suitably increasing the strength of the parts or by the provision of supplementary clamping means. Examples of such supplementary clamping means are illustrated in Figures 6 to 14. In the example shown in Figures 6, 7 and 8 swing bolts 56 pivoted to lugs 57 on the lower mould member 2 are adapted to engage with lugs 58 on the upper mould member, so that by means of nuts 59 on the said bolts bearing on the lugs 58, the two mould members can be securely held together. At the hinge 3 of the upper and lower mould members provision may be made for a certain slackness of fit to allow the two mould members to fit together properly and set screws 60 provided in the said hinge lugs 2ª of the lower mould member may bear on the hinge pin or shaft 3 preferably through interposed brass pads 61 in order to prevent "spring" at this portion of the circumference of the press. The set screws may be adjusted occasionally to regulate the slackness at the hinge.

In the construction shown in Figures 9 to 12 the supplementary clamping means are provided at the front portion of the press and lugs or projections 62 and 63 are provided on the upper and lower mould members respectively as shown in Figure 9, the arrangement of these lugs being similar to the arrangement of the hinge lugs 1ª and 2ª at the opposite part of the press. The said lugs 62 and 63 are provided with holes or bores 62ª and 63ª extending through the same but the hole 62ª in the lug 62 is slightly above the holes 63ª in the lugs 63. Located in the lugs 63 are screw operated plungers 64 having coned ends which are adapted to enter coned recesses on ends in the aforesaid hole 61ª in the lug 62. The screw operated plungers 64 may be provided with operating handles 65 and the screw may be of quick pitch so as to enable slight angular movement of the said handles 65 to cause the coned ends of the plungers to enter the coned ends of the hole in the lug 62 sufficiently to bring the holes in the different lugs into or towards coaxial alignment to positively hold the mould members in contact and against separation after being closed by the toggle mechanism. In the construction illustrated in Figures 13 and 14 the upper mould member may carry at different points around its circumferential U-shaped swinging links 66 which normally assume the position shown in Figure 13 but can be swung downwardly to fit over lugs 67 on the lower mould member, each of the lugs 67 being formed with a cam surface that is engaged by the link 66 in order to provide the additional clamping action. An eccentric pivot pin 68 may be provided for the hinged link so that it can be adjusted to compensate for wear on the cam surface of the lug 67 or the engaging surface on the link 66.

Figures 15 to 18 illustrate modifications with regard to the connections of the toggle lever 17 to the upper mould member. In Figures 15 and 16 the toggle lever 17 is pivotally connected by the pins 18 to bridge pieces 69 which bear on and are secured to suitable pads or raised surfaces 70 on the upper mould member so as to enable the pressure to be exerted on four points as illustrated in Figure 15 instead of on two points as shown in Figures 1 to 4. In the examples illustrated in Figures 17 and 18, bridge pieces 71 pivotally connected to the toggle link 17 are connected to lugs 72 on the upper surface of the upper mould member. The bridge pieces may be forked at the ends to engage with the lugs 72 as shown in the upper half of Figure 17 in which case the toggle lever 17 may fit within a slotted part of the bridge piece. The bridge piece may however fit in forked lugs as shown in the lower half of Figure 17 and a forked end may be provided on the toggle lever for fitting over the bridge piece as shown.

The toggle mechanism and other features according to this invention may be applied to vulcanizing presses of various types in which the mould members are horizontally or vertically disposed for different kinds and sizes of tyres, tyre tubes and the like. Instead of employing a fixed central support for the tyre unit as hereinbefore referred to an expansible former such as is used in some types of vulcanizing presses may be provided. The invention can also be used in connection with the moulding of other rubber articles, for instance golf balls and tenni and other playing balls and football bladders but it is not limited to moulds or presses for dealing with rubber articles as it can be applied generally to the moulding and pressing of goods of various kinds for instance bricks, chocolates, vulcanite, metal goods and other articles where a substance or material is to be moulded or pressed between cavity moulds or plates which can be operated and controlled by toggle mechanism as hereinbefore described.

What I claim and desire to secure by Letters Patent of the United States is:—

1. A press comprising two hinged mould members, links pivotally connected to one of said members and a lever pivotally secured to said links and to the other mould member.

2. A press comprising upper and lower mould members adapted to be angularly moved on a horizontal axis, side links connected to the lower mould member and an arm or lever pivotally connected to the side links and to the upper mould member.

3. A press comprising two hinged mould members, links pivotally connected to one of said members, a lever pivotally secured to said links and to the other mould member, screw rods connected at one end to the upper mould member and threaded through nuts in the said links and means for rotating the screw rods for causing angular movement of the links, the said lever and the mould members connected thereto.

4. A press comprising mould members, mechanism for opening and closing said members, a support for enabling an article to be held between the mould members and hooked levers adapted to engage said article on the support and to be engaged by part of the opening mechanism to retain them in the operative position and to move under the action of gravity to assume the releasing or inoperative position when released by the said part of the opening mechanism.

5. A press comprising upper and lower mould members hinged together on a horizontal axis, a transverse shaft on the lower mould member, side links mounted on said shaft and connected by a transverse shaft, and a lever member on the latter shaft pivotally connected to the upper mould member and adapted to bear on oppositely disposed points on this member when the side links and the lever member are in the same plane or substantially the same plane.

6. A press comprising upper and lower mould members hinged together on a horizontal axis, a transverse shaft on the lower mould member, side links mounted on said shaft and connected by a transverse shaft, a lever member on the latter shaft pivotally connected to the upper mould member and adapted to bear on oppositely disposed points on this member when the side links and the lever member are in the same plane or substantially the same plane, and bridge like bearing pieces between said lever member and the upper mould member.

7. A press comprising upper and lower mould members hinged together on a horizontal axis, a transverse shaft on the lower mould member, side links mounted on said shaft and connected by a transverse shaft, a lever member on the latter shaft pivotally connected to the upper mould member and adapted to bear on oppositely disposed points on this member when the side links and the lever member are in the same plane or substantially the same plane, and fixed pins for fitting in slots in said links to serve as locating and fulcrum means.

8. A press comprising upper and lower mould members, side links connected to the lower member, a lever connected to said links and to the upper member, swivel nuts in said links screw rods threaded through said nuts and connected in a swivelling manner to the upper mould member, gear wheels on said rods, and a transverse operating spindle having gear wheels for rotating said rods.

9. A press comprising upper and lower mould members, side links connected to a transverse shaft on the lower member, a lever connected to the links and to the upper member and bell crank levers pivoted on a fixed support and provided with hooked upper ends for engaging with the article supported in the press, said bell crank levers being controlled by the raising and lowering of said transverse shaft.

10. A press as in claim 9 comprising a fixed and independent support for the article, means for supplying fluid pressure to the article on said support and means whereby the said transverse shaft on the lower mould member in being raised and lowered is adapted to connect and disconnect a fluid pressure supply pipe to and from the article on said support.

11. A press as in claim 9 comprising a fixed and independent support for the article, means for supplying fluid pressure to said article on said support, a fluid pressure supply pipe, a control valve for said fluid pressure, means whereby said transverse shaft on the lower mould member connects the supply pipe to said article and means whereby the valve is automatically opened after said connection has been made.

12. A vulcanizing or similar press comprising adjacent mould members hinged or similarly connected together and toggle mechanism connected to one of the adjacent mould members, said mechanism including a lever secured to the other mould member, and adapted to be operated for opening and closing the press and to maintain the press in the closed position.

13. A vulcanizing or similar press having upper and lower mould members and toggle mechanism for operating the mould members, said toggle mechanism comprising links connected near one of their ends to the upper mould member and at the other end to a lever, said lever being connected to the upper mould member, whereby movement of the links by the toggle mechanism opens or closes the press and maintains the press closed during the treatment of the article therein.

14. A vulcanizing or similar press comprising horizontal upper and lower mould members hinged together for vertical movement, links connected to the sides of the lower mould member, a lever connected to the upper mould member, and a connection between said side links and said lever, whereby the lower mold member in conjunction with the link mechanism retains the upper mould member in the open position.

15. A vulcanizing press for pneumatic tires or the like, comprising vertically movable moulds, a support for the tire unit, toggle mechanism for opening and closing the moulds, gripping devices for holding the tire unit on said support, and means for operating said devices by the operation of said toggle mechanism.

16. A vulcanizing or similar press for pneumatic tires or the like comprising vertically movable moulds, a fixed support for the tire unit between the moulds, gripping devices on said fixed support for retaining the tire unit on the fixed support, said gripping devices being operable by the movement of the moulds to positively separate the tire unit from one mould member, the other mould member being positively separated from the tire unit by engagement with the said fixed support.

17. A vulcanizing press for pneumatic tires, comprising a frame, a fixed support in said frame for the tire unit, vertically movable mould members mounted on the frame independently of the fixed support, toggle mechanism for operating the moulds, gripping devices for the tire unit on said fixed support, the operation of said toggle mechanism operating said gripping devices to hold said tire unit on said fixed support during the initial opening movement of the moulds, and releasing said gripping devices when the mould is fully open.

18. A vulcanizing press for pneumatic tires, comprising a frame, a fixed support in said frame for the tire unit, vertically movable mould members mounted on the frame independently of the fixed support, toggle mechanism for opening and closing the moulds, gripping devices comprising bell-crank levers pivoted to said fixed support and hooked at one end to engage over the tire unit, the other end being associated with the toggle mechanism to hold said levers in engagement with the tire unit against the action of gravity when the moulds are in operative position, whereby when the moulds are in inoperative position said levers fall into a vertical position out of the way of the removal of the tire unit.

19. In a vulcanizing or similar press, vertically movable moulds, toggle mechanism for moving said moulds, means in the press for subjecting the article being moulded to internal pressure by a fluid medium, and means connected with the toggle mechanism whereby the supply of the medium is automatically controlled by the operation of the aforesaid toggle mechanism.

20. A vulcanizing press for pneumatic tires, comprising vertically movable mould members adapted to operate on the tire unit, toggle mechanism for moving said mould members to closed position, a supply pipe for fluid, and a member associated with the toggle mechanism for connecting said supply pipe to the tire unit when said mould members are closed around the tire unit.

21. A vulcanizing press for pneumatic tires, comprising vertically movable mould members adapted to operate on the tire unit, toggle mechanism associated with the mould members for moving said mould members, a nozzle for the admission of fluid to the tire unit associated with said toggle mechanism, and a member on the toggle mechanism operated by the closing of said moulds to connect said nozzle to the tire unit.

COLIN MACBETH.